Aug. 25, 1936.  J. H. WIGGINS  2,052,332
DIFFERENTIAL PRESSURE VALVE
Filed Jan. 7, 1935
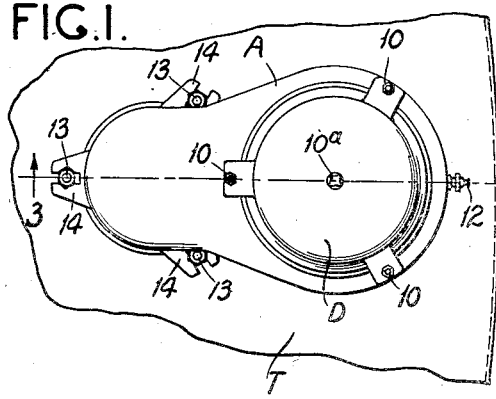
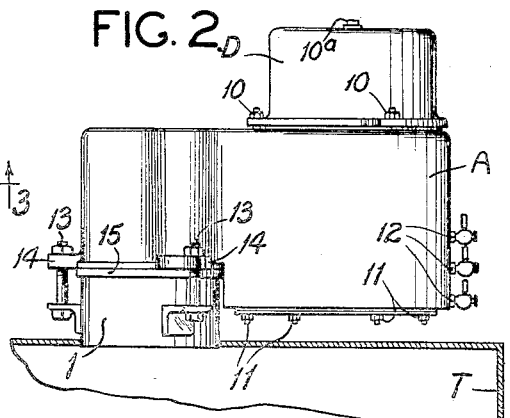
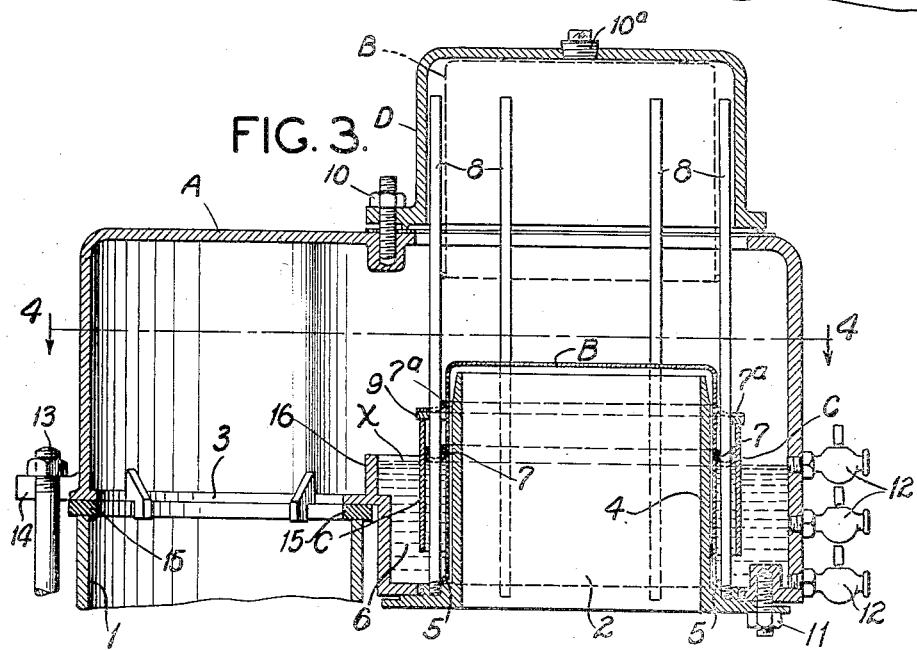
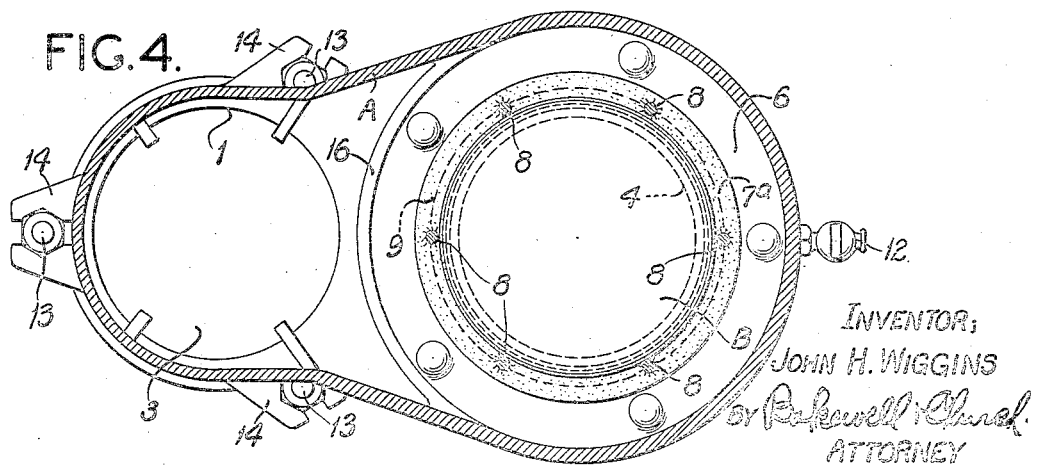

Patented Aug. 25, 1936

2,052,332

UNITED STATES PATENT OFFICE 2,052,332

DIFFERENTIAL PRESSURE VALVE

John H. Wiggins, Tulsa, Okla.

Application January 7, 1935, Serial No. 682

9 Claims. (Cl. 137—53)

This invention relates to vent valves for gastight tanks and containers, and particularly differential pressure valves of the type in which the control element of the valve consists of a substantially inverted cup-shaped member arranged so that when the valve is closed, the lower end portion of said control element is submerged in a body of sealing liquid.

One object of my invention is to provide a vacuum relief or pressure relief vent valve of the general type mentioned, which is of such design or construction that a considerable variation in pressure differential is required to move the control element of the valve into its wide open position and fully closed position, thereby preventing the control element from bobbing up and down rapidly in the sealing liquid, as is liable to occur under certain conditions, with vent valves of conventional construction.

Another object is to provide a differential pressure valve of the general type mentioned that is equipped with a relatively large liquid reservoir and also with means which effectively prevents the sealing liquid from being splashed out of its reservoir during the opening and closing movements of the control element of the valve, thereby permitting glycerine or a similar substance to be used for sealing the control element, notwithstanding the fact that glycerine is relatively expensive.

Another object is to provide a liquid sealed vacuum relief or pressure relief valve of the general type mentioned, which is so designed that the control element will not move into its fully wide open position until a certain pressure differential is approximately attained, and thereafter will not return to its sealed condition until a pressure differential substantially different from that which caused the control element to move into its wide open position, is attained. In the case of a pressure relief valve, the control element will not return to its sealed condition until the positive pressure in the tank or container on which the valve is used has dropped to a degree considerably lower than the degree of pressure which caused the control element to move into its wide open position, and in the case of a vacuum relief valve, the control element will not return to its sealed condition until the minus pressure in the tank has risen to a degree considerably higher than the degree of minus pressure which caused the control element to move into its wide open position.

And still another object of my invention is to provide a vent valve of the type mentioned, whose control element and co-acting parts are of such construction and arrangement that they can be machined easily during fabrication; and when the valve is in use, said parts may be easily inspected, cleaned or replaced, without emptying the liquid reservoir, or removing the valve casing from the tank or container to which it is attached. Other objects and desirable features of my invention will be hereinafter pointed out.

Figure 1 of the drawing is a top plan view of my improved differential pressure valve.

Figure 2 is a side elevational view of said valve.

Figure 3 is an enlarged longitudinal sectional view, taken on the line 3—3 of Figure 1; and Figure 4 is a horizontal sectional view, taken on the line 4—4 of Figure 3.

In the accompanying drawing I have illustrated my invention embodied in a vacuum relief valve that is used to automatically admit air or other gas to a tank or container so as to prevent a dangerous or destructive vacuum from being created in said tank, but I wish it to be understood that my invention is applicable to a pressure relief valve that is used to permit air or gas to escape automatically from a tank or container so as to prevent a dangerous pressure from being created in the tank. While the valve herein illustrated is described as being used for vacuum relief, it may also be used for pressure relief, simply by attaching the valve casing to the tank in such a way that the tubular part of the valve over which the control element is telescoped, is in alignment with or in direct communication with a vent opening in the tank. In instances where it is necessary or desirable to equip the tank or container with two separate and distinct vent valves, one for pressure relief and one for vacuum relief, the vacuum relief valve may be attached to the tank, as herein illustrated, and a pressure relief valve of similar construction, may be attached to the top portion of the casing of the vacuum relief valve in such a way that the control element of the pressure relief valve will be unsealed by a certain approximate positive pressure created in the tank, and the control element of the vacuum relief valve will be unsealed when a certain minus pressure has been approximately created in the tank. Due to the fact that my invention is applicable to pressure relief valves and vacuum relief valves, the broad term "pressure", as herein used, is intended to mean either a positive pressure, or a minus pressure in the tank or container on which the valve is used.

My improved valve comprises an elongated casing or hollow body portion A constructed so that it can be easily mounted on and attached to a tank T, which, in its normal functioning, requires either that air or gas be admitted to the tank under certain conditions, or that air or gas be permitted to escape from the tank under certain conditions, or both. When the valve is used for vacuum relief, i. e., for admitting air or gas to the tank T, the casing A is attached to a vent 1 on the roof of the tank, as illustrated in Figures 2 and 3, whereby air or gas may enter the casing A through an air inlet 2 at one end of same when the control element of the valve is unsealed, and circulate through the casing to an outlet 3 in the bottom of the casing that aligns with the vent 1 on the tank. The control element of the valve is formed by a substantially inverted cup-shaped member B arranged in telescopic relationship with a vertically-disposed tubular part 4 of the valve casing that surrounds, or, in fact, constitutes the air inlet 2 previously mentioned, said control element B being preferably formed from aluminum or some other suitable relatively light weight metal, so as to permit said control element to rise and admit air or gas to the tank T when a certain minus pressure is created in said tank. Normally, the control element B occupies the position shown in full lines in Figure 3, and serves as an efficient closure for the air inlet 2. At such times the bottom edge of the control element B rests upon a horizontally-disposed, annular ground valve seat 5 that surrounds the tubular member 4, and the lower end portion of said control element is submerged or immersed in a body of sealing liquid $x$ confined in an annular reservoir 6. Obviously, the top portion of the casing A of the valve must be constructed in such a way as to provide sufficient clearance for the control element B to permit said control element to rise or move upwardly high enough to unseal said control element and permit air or gas to circulate through the casing of the valve to the vent 1 of the tank.

As previously stated, my improved valve is distinguished from differential pressure valves of conventional construction, in that the normal functioning of the tank T will not result in the control element B bobbing up and down rapidly in the sealing liquid $x$. It is also distinguished from valves of conventional design, in that a considerable variation in pressure differential is required to move the control element B into its wide open position, and after said control element has fully opened, it will remain in its unsealed condition until the pressure differential has changed considerably from that which existed when the control element moved into its wide open position. These desirable results are attained by equipping the valve with a means that exerts frictional pressure on the control element B, so as to retard or check the movement of same, during part of the movement of said control element into its wide open position and back to its sealed condition. In the preferred form of my invention herein illustrated the control element B is surrounded by one or more horizontally-disposed, ring-shaped wipers or friction devices 7 and 7a, made of such material and in such a way as to be capable of flexing freely like the bristles of a brush, and disposed so as to surround and bear upon the annular side portion of the control member B when said control member is sealed by the liquid $x$, the wiper 7 preferably being arranged so that it will be immersed in or kept in a moist or wet condition by the liquid $x$ in the reservoir 6, and the wiper 7a being arranged at a point above the surface of the liquid in said reservoir. It is immaterial how said wiper or wipers is or are sustained or supported. In the valve herein illustrated, vertically-disposed guide rods 8 are provided for maintaining the control element B in concentric relationship with the tubular member 4 over which it telescopes, and the wipers are supported or carried by said guide rods, the wiper 7a being attached to an annular ring 9 fastened to said guide rods, and the bottom wiper 7 being attached to an open ended, tubular-shaped vertically-disposed baffle C that is suspended from the annular ring 9. The wipers 7 and 7a, in addition to exerting frictional pressure on the control element B and retarding the movement of said element, as hereinafter explained, also remove from or wipe off the controlling element, globules of sealing liquid that adhere to said control element when said element rises or moves upwardly out of the sealing liquid in the reservoir 6. Said wipers are of such construction that they will bend or flex upwardly when the control element B rises, and will bend or flex downwardly when said control element returns to its sealed or seated condition. It is not essential that the valve be equipped with a plurality of friction elements or wipers, although I prefer to construct it in this manner.

As the pressure in the tank T decreases below atmospheric pressure to a point which is equal to the weight of the control element B, said control element will tend to rise. The friction of the wipers 7 and 7a, retards or checks such upward movement of the control element B until the internal pressure of the tank T has further decreased sufficiently to overcome such friction. When the internal pressure of the tank T has decreased sufficiently to overcome both the weight of the element B and the friction on said element produced by the wipers 7 and 7a, then the element B will rise or move upwardly, and even though the wiper or wipers are not absolutely gas tight, relative to the side portion of the control element B, they are practically so. Accordingly, a valve of the construction above described will not open freely until the control element reaches such a point that the wiper or wipers do not exert frictional pressure on the same. Immediately after the control element B has freed itself from the friction of the highest wiper 7a, then said element B will move suddenly into its wide open position, since now the only force to overcome by the differential pressure is the weight of the control element B and not the friction. The element B will remain in an unsealed condition, either fully or partially open, until the differential pressure has been reduced to the weight of the element B only, whereupon said element B will move downwardly into engagement with the highest wiper 7a, thus causing the valve to substantially close and cut off the flow of air or gas through the casing of the valve from the inlet 2 to the vent 1 on the tank T. The differential pressure at which this closure takes place is less than the differential pressure required to open the valve. After the control element B has contacted the highest wiper 7a, and thus substantially closed the valve, then the pressure in the tank T has to reduce still further before the element B is lowered an amount necessary to overcome the friction created by the action of the highest wiper 7a on the control element. When this pressure is attained the control element B will continue to move downwardly until it seals itself in the liquid $x$ in the reservoir 6.

Thus, it will be seen that in a valve of the construction above described the control element B will not bob up and down rapidly in the liquid used to seal the same. Still another very desirable characteristic of such a valve is that it will open freely at one pressure, and will not close until the pressure has been reduced considerably below the pressure that caused the valve to open. Owing to the fact that the reservoir 6 is relatively large, and means are provided for preventing the sealing liquid from being splashed or thrown out of the reservoir, it is practicable to use glycerine or a similar substance to seal the control element B, notwithstanding the relatively high cost of glycerine.

As previously stated, the valve is equipped with an open-ended, tubular-shaped baffle C that surrounds the control element B and is suspended in the reservoir 6 with the lower end of said baffle immersed in the sealing liquid, but spaced away from the bottom of the reservoir. The vertical side wall portion of the control element B is so disposed with relation to the outer side wall of the reservoir and the tubular member 4 over which said control element is telescoped, that the area of the sealing liquid on the inner side of the vertical side wall portion of the control element is a small proportion of the area of the sealing liquid on the outer side of said vertical side wall portion. During the upward movement of the control element B to open the valve, the baffle C greatly decreases the venting area when the bottom edge of the control element B rises above the surface of the liquid $x$ in the reservoir 6, and thus allows a minimum amount of gas or air to flow through the casing of the valve. It materially reduces the velocity of the air flowing through the casing of the valve, and it causes any entrained liquid to drop out of the air and return to the reservoir, said baffle C being so disposed that it directs the entrained liquid vertically upward through the open upper end of the baffle, instead of allowing said liquid to move horizontally towards the vent 1 on the tank T. Another desirable feature of a differential pressure valve equipped with a control element B of the construction and arrangement herein illustrated, is that the liquid $x$ in the reservoir 6 has to be lowered considerably before the valve will become unsealed, due to positive pressure created in the tank T, this of course being due to the fact that the area of the sealing liquid on the inner side of the vertical side wall portion of the baffle C is only a small proportion of the area of the liquid on the outer side of said vertical side wall portion.

In order that the control element B and the parts directly associated with the same may be inspected, repaired or replaced without emptying the liquid reservoir 6 or detaching the valve casing from the tank, a portion of the top wall of the casing A is constructed in the form of a removable cap or cover D that is arranged directly above the control element B and retained in position by fastening devices 10, said removable cap or cover D being equipped with a filling hole normally closed by a plug or the like 10a through which the sealing liquid $x$ may be introduced into the reservoir 6 without removing the cap D from the valve casing, The tubular member 4 that constitutes the inner side wall of the reservoir 6 is preferably constructed in the form of a separate part that carries the guide rods 8, the baffle C and the wiper or wipers that act upon the control element B, and is detachably connected to the valve casing A by screw-threaded studs or other suitable fastening devices 11. When the valve is used as a pressure relief valve, 1, said studs 11 are used to attach the valve casing to the vent of the tank. In order that the quantity of liquid in the reservoir 6 may be easily determined without removing the cap D, said reservoir is provided with a plurality of stop cocks or equivalent devices 12 arranged at different levels, as shown in Figure 3, so as to test the height of the liquid in said reservoir. The valve casing A is attached to the vent 1 on the tank T by fastening devices 13 arranged in open-ended slots formed in laterally-projecting lugs 14 on the valve casing, and a gasket 15 is interposed between the upper end of said vent and the underside of the valve casing, said gasket being preferably formed of relatively soft material, so as to facilitate leveling the valve casing when it is being attached to the vent 1. The right hand end portion of the valve casing that houses the control element B and its associated parts is made of slightly greater diameter than the left hand end portion of said casing, so that said right hand end portion may be used as a reservoir for the sealing liquid, and if desired, a transverse partition 16 may be arranged on the interior of the casing, as shown in Figure 3, so as to produce a relatively deep reservoir.

Having thus described my invention, what I claim as new and desire to secure by Letters Patent is:

1. A vent valve for tanks and containers, comprising a cylindrical control element that is adapted to be opened and closed by a difference in pressure, a reservoir adapted to hold a body of liquid for sealing said element when the valve is closed, and an annular friction device arranged so as to directly engage said control element, only when a portion of said element is in contact with the sealing liquid, whereby said control element, after moving into its open position, will remain in an unsealed condition until a pressure differential substantially different from that which effected the unsealing of said control element is created.

2. A vent valve for tanks and containers, comprising a cylindrical control element that is adapted to be opened and closed by a difference in pressures exerted on opposite sides of said control element, a valve casing provided with a portion for holding a body of liquid for sealing said control element when the valve is closed, and an annular shaped wiper and friction device arranged in concentric relation with said control element and adjacent the sealing liquid, for retarding or checking the movement of said element, during a portion of its travel, said device being freely flexible, like a brush.

3. A differential pressure valve of the type described, comprising a substantially inverted cup-shaped control element, a reservoir containing sealing liquid in which the lower end portion of said element is submerged when the valve is closed, and a flexible, annular-shaped wiper arranged so as to contact the side wall of said element and retard the movement of said element during a portion of the movement of said element away from or towards its closed position.

4. A differential pressure valve of the type described, comprising a casing provided with a reservoir that contains a sealing liquid, a substantially inverted cup-shaped control element that is sealed by said liquid when the valve is fully closed, and a substantially annular wiper surrounding the side wall portion of said control element and arranged in close proximity to the surface of said sealing liquid.

5. A differential pressure valve, comprising a casing provided with a tubular member that constitutes a gas passageway, a means on said casing that co-operates with said tubular member to form a reservoir, a substantially inverted cup-shaped control element in telescopic arrangement with said tubular member, a body of liquid in said reservoir for sealing said control element when it is in its closed position, and an annular wiper of flexible material arranged in concentric relationship with said tubular member and adapted to act on the side wall portion of said control element, for the purpose described.

6. A differential pressure valve, comprising a casing provided with a tubular member that constitutes a gas passageway, a substantially inverted cup-shaped control element arranged in telescopic relation with said tubular member, an annular reservoir surrounding said tubular member for holding liquid that is used to seal said control element, and a stationary, vertically-disposed, tubular baffle suspended in said reservoir with its lower end submerged in liquid in said reservoir and arranged between said tubular member and the outer side wall of said reservoir, a wiper arranged adjacent the surface of the liquid in the reservoir, in contact with the side wall portion of said control element.

7. A differential pressure valve, comprising a casing provided with a tubular member that constitutes a gas passageway, a substantially inverted cup-shaped control element arranged in telescopic relation with said tubular member, an annular reservoir surrounding said tubular member for holding liquid that is used to seal said control element, and a stationary, vertically-disposed, tubular baffle suspended in said reservoir with its lower end submerged in liquid in said reservoir and arranged between said tubular member and the outer side wall of said reservoir, guide rods for the control element that project upwardly from the bottom of said reservoir, and a freely flexible, ring-shaped wiper sustained by said annular baffle and arranged to act on the side wall portion of said control element.

8. A differential pressure valve, comprising a casing having a gas opening formed in the under side of the same at one end of the casing, a removable tubular shaped member disposed vertically inside of the casing at the opposite end of same and adapted to serve as a gas passageway, the casing having parts that co-operate with said tubular member to form an annular reservoir for holding a body of sealing liquid, a substantially inverted cup-shaped control element arranged in telescopic relationship with said tubular member, disposed so that the lower end portion of said control element is submerged in the liquid in said reservoir when the valve is closed, an annular wiper that is adapted to act on the side wall portion of said control element to retard or check the movement of said element, and a detachable cap or removable portion at the upper end of the casing arranged in substantially longitudinal alignment with said control element and constructed so as to receive and house the same when the valve is in its fully open position.

9. A differential pressure valve of the kind described in claim 8, in which vertically-disposed guide rods for the control element are combined with said tubular member, and an annular baffle equipped with a wiper, carried by said guide rods and arranged to co-act with said control element, substantially as described.

JOHN H. WIGGINS.